(12) United States Patent
Dubey

(10) Patent No.: US 7,347,895 B2
(45) Date of Patent: Mar. 25, 2008

(54) FLEXIBLE HYDRAULIC COMPOSITIONS

(75) Inventor: Ashish Dubey, Grayslake, IL (US)

(73) Assignee: United States Gypsum Company, Chicago, IL (US)

( * ) Notice: Subject to any disclaimer, the term of this patent is extended or adjusted under 35 U.S.C. 154(b) by 2 days.

(21) Appl. No.: 11/224,403

(22) Filed: Sep. 12, 2005

(65) Prior Publication Data

US 2006/0054060 A1    Mar. 16, 2006

Related U.S. Application Data

(60) Provisional application No. 60/610,389, filed on Sep. 16, 2004.

(51) Int. Cl.
*C04B 18/06* (2006.01)

(52) U.S. Cl. .................. 106/705; 106/DIG. 1
(58) Field of Classification Search ................ 106/705, 106/DIG. 1, 724

See application file for complete search history.

(56) References Cited

U.S. PATENT DOCUMENTS

| 4,229,329 A | | 10/1980 | Bennett | |
|---|---|---|---|---|
| 4,494,990 A | * | 1/1985 | Harris | |
| 4,588,443 A | | 5/1986 | Bache | |
| 4,714,722 A | * | 12/1987 | Najvar et al. ................ | 523/218 |
| 4,725,632 A | * | 2/1988 | Vess .......................... | 523/220 |
| 5,192,366 A | * | 3/1993 | Nishioka et al. ............. | 106/724 |
| 5,308,397 A | * | 5/1994 | Whatcott ..................... | 106/711 |
| 5,346,550 A | * | 9/1994 | Kunzi et al. ................. | 106/709 |
| 5,549,859 A | | 8/1996 | Andersen et al. | |
| 5,603,758 A | * | 2/1997 | Schreifels, Jr. et al. ...... | 106/677 |
| 6,167,668 B1 | | 1/2001 | Fine et al. | |
| 6,171,388 B1 | * | 1/2001 | Jobbins ....................... | 106/778 |
| 6,455,615 B2 | * | 9/2002 | Yu et al. ......................... | 524/5 |
| 6,537,366 B1 | * | 3/2003 | Supplee, Sr. ................. | 106/712 |
| 6,569,923 B1 | * | 5/2003 | Slagter .......................... | 524/5 |
| 6,586,353 B1 | * | 7/2003 | Kiik et al. ................... | 442/320 |
| 2003/0004246 A1 | * | 1/2003 | Wache et al. ............... | 524/425 |
| 2004/0204516 A1 | * | 10/2004 | DeFord et al. ................. | 524/2 |

OTHER PUBLICATIONS

University of California, Berkeley; 2003 Bearkelium; Concrete Canoe Design Report.
University of Alabana in Huntsville; 2000 Concrete Canoe Design Report; "INGENUITY"; Designing reinforced concrete from a new perspective.
The Sydney Morning Herald; May 28, 1987; It Flies . . . Here's Concrete Evidence; Clemson University Concrete Canoe Team "Instinct".

* cited by examiner

*Primary Examiner*—Paul Marcantoni
(74) *Attorney, Agent, or Firm*—Michael M. Geoffrey; David F. Janci; Carole A. Mickelson

(57) ABSTRACT

A composition for making flexible articles includes a hydraulic component of at least 50 weight % fly ash, a water-soluble, film-forming polymer and water. Articles are made from this composition by making a slurry of the components, forming the article and allowing it to set.

9 Claims, 3 Drawing Sheets

FLEXIBLE HYDRAULIC COMPOSITIONS

CROSS REFERENCE TO RELATED APPLICATIONS

This application claims the benefit of U.S. Provisional Ser. No. 60/610,389, filed Sep. 16, 2004, and is related to copending U.S. Ser. No. 11/224,398, entitled, "Flexible and Rollable Cementitious Membrane and Method of Manufacturing It," filed concurrently herewith, both of which are herein incorporated by reference.

FIELD OF THE INVENTION

This invention relates to flexible hydraulic compositions. More specifically, this invention relates to articles made from a fly ash composition that can be shaped, carved and deformed, and a method to make them.

BACKGROUND OF THE INVENTION

A large variety of hydraulic components are available and are selected depending on the end use of the article under construction. Outdoor statuary, architectural moldings, mortars, grouts, tiles and the like are often made of concrete because it withstands water and weather. Gypsum is generally reserved for indoor use, such as plaster or drywall. Both of these materials form a settable slurry when added to water that can be used in a variety of ways. The slurry can be applied with a trowel for patching. It can be molded to form statuary. Either material can be used in mortars and grouts to set tiles or bricks in place.

However, concrete and gypsum both harden to be very rigid, brittle materials. Once set, it is not practical to change their shape. For example, when used as a grout for ceramic tile, if there is a shift in the underlayment, the grout usually cracks because it cannot deform to move with the shift. When subjected to a sudden impact, concrete and gypsum often break because they cannot absorb the force by deformation.

Another disadvantage of concrete is the length of the time needed to cure the material. Concrete cannot hold its own weight for hours, and does not fully cure for a week or more. When making molded articles, the molds cannot be turned around and reused until the following day. If the concrete is used to make something that must bear the weight of other articles, such as the basement floor in a new house, the floor cannot be used for several days until the concrete is more fully cured.

Gypsum has a considerably shorter setting time, but has its own disadvantage in the amount of dust generated when, for example, joint compound is finished. To smooth the surface of a joint and feather the edges so that they blend with the adjoining dry wall, joints are sanded, creating quantities of very fine dust that can be carried great distances before settling out. In addition to leaving dust some distance from the site being patched, this fine dust becomes a nuisance to those who breathe it.

U.S. Pat. No. 6,455,615 to Yu discloses a flexible polymer modified cement that can be used alone or on a substrate. It is disclosed for use in concealed areas of construction engineering, water conservancy projects and municipal works. A hydraulic cement, a polymer dispersion and water are calendared to form sheets, then dried until the composition is firm. The hydraulic component optionally includes from 20% to about 50% other hydraulic components, including fly ash, silica fume, metakaolin and slag.

SUMMARY OF THE INVENTION

A composition for the manufacture of articles includes a hydraulic component having at least 50% hydraulic fly ash; a water-soluble, film-forming polymer and water. This composition sets rapidly, forming a flexible, deformable solid that has many uses. Despite the relatively low amount of polymer, the resulting composition has properties more similar to a plastic than a hydraulic component. Optionally, the composition also includes one or more additives, including dispersants, surfactants, water reducing agents, foaming agents, defoamers, colorants, shrinkage reducing agents, reinforcing fibers and fillers.

Because of the setting properties of this composition, it is useful in a number of applications for which concrete or gypsum are traditionally used. This flexible hydraulic composition could be used, for example, to make quick-setting, flexible tiles. Such tiles could be used to build a curved wall. It could be used for a floating floor, such as a dance floor, that has some "give" to it and is easier on the feet of the dancers.

Flexible compositions of this type are also useful because they are less brittle, and can be treated with tools to provide greater detail or better fit than concrete or gypsum articles. Articles made from this composition can be shaped with conventional tools to add architectural details, artistic details or to improve the fit. When shaped or sanded, this material does not produce the type of fines associated with gypsum, but instead produces particles that are heavy enough to cleanly drop out of the air. The reduced brittleness of the material also produces articles that are less likely to break or crack as a result of an external impact.

In addition, articles made from this composition are substantially impermeable to water. It can be used as a water-proofing material. Grouts and mortars made from this composition do not require sealing to prevent absorption of liquids that might stain or discolor them.

Further, articles can be molded, including injection molding, to make a wide variety of articles. Once made, these articles are less breakable because forces can be absorbed by deformation of the article, rather than breakage of the article. Statuary is less brittle. Architectural moldings and details do not break. There are many uses for a strong, settable material that is not brittle.

DETAILED DESCRIPTION OF THE DRAWINGS

DETAILED DESCRIPTION OF THE INVENTION

Figure 1:
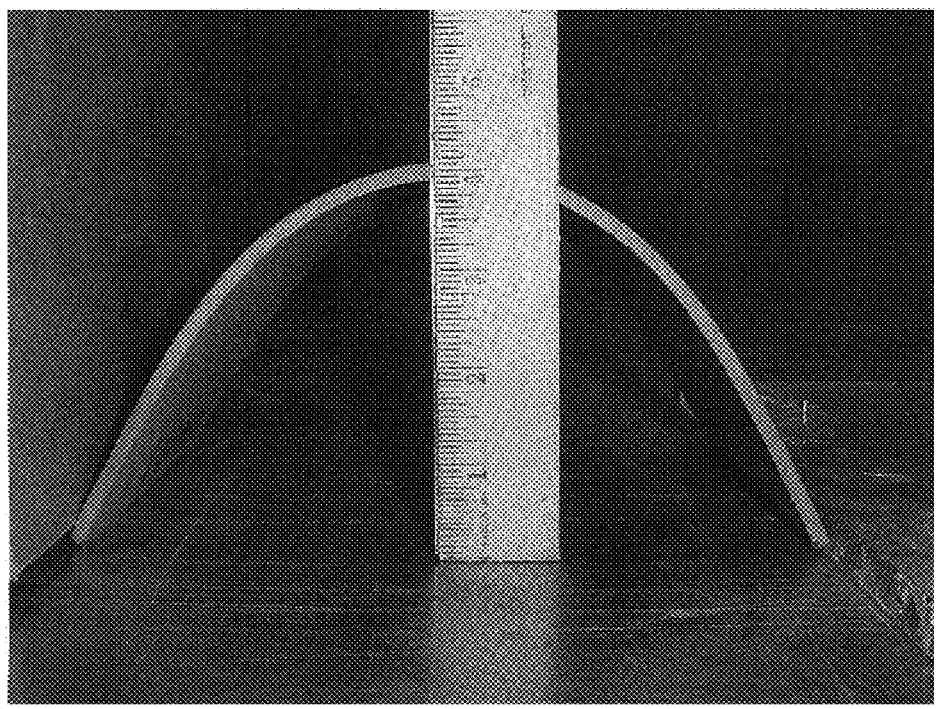
FIG. 1 shows a flexed panel made with the composition of the present invention.

The composition of the present invention includes a hydraulic component, a polymer and water. Unless otherwise noted, amounts or concentrations reported herein describing the compositions are on a weight basis.

Any hydraulic components that include at least 50% fly ash are useful in the instant composition. Class C hydraulic fly ash, or its equivalent, is the most preferred hydraulic component. This type of fly ash is a high lime content fly ash that is obtained from the processing of certain coals. ASTM designation C-618, herein incorporated by reference, describes the characteristics of Class C fly ash (Bayou Ash Inc., Big Cajun,II, La.). When mixed with water, the fly ash sets similarly to a cement or gypsum. Use of other hydraulic components in combination with fly ash are contemplated, including cements, including high alumina cements, calcium sulfates, including calcium sulfate anhydrite, calcium sulfate hemihydrate or calcium sulfate dihydrate, other hydraulic components and combinations thereof. Mixtures of fly ashes are also contemplated for use. Silica fume (SKW Silicium Becancour, St. Laurent, Quebec, Calif.) is another preferred material.

While not wishing to be bound by theory, it is believed that the shape of the fly ash particle contributes significantly to the characteristics of this composition. The spherical shape of fly ash creates a "ball bearing" effect in the mix, improving workability of the composition without increasing water requirements. In addition, some fly ashes have been shown to significantly decrease heat generation as the concrete hardens and strengthens. Fly ash, as do all pozzolanic materials, generally provides increased strength gain for much longer periods than mixes with Portland cement (St. Mary's Cement Inc., Detroit, Mich.) only. In the set product, there appears to be a larger proportion of amorphous material than is found in gypsum or concrete, allowing more flex in the material.

Another reason fly ash is preferred in this composition is the increased life cycle expectancy and increase in durability associated with its use. During the hydration process, fly ash chemically reacts with the calcium hydroxide forming calcium silicate hydrate and calcium aluminate, which reduces the risk of leaching calcium hydroxide, making the composition less permeable. Fly ash also improves the permeability of hydraulic compositions by lowering the water-to-cement ratio, which reduces the volume of capillary pores remaining in the set composition. The spherical shape of fly ash improves the consolidation of the composition, which also reduces permeability. It is also theorized that tricalcium aluminate, which is frequently present in fly ash, acts as a set accelerator to speed up the setting reactions.

In some embodiments of the invention, the hydraulic component includes at least 50% hydraulic fly ash by weight. Preferably, the hydraulic component includes at least 55% hydraulic fly ash. More preferably, the hydraulic component includes at least 60% hydraulic fly ash. More preferably, the hydraulic component includes at least 65% hydraulic fly ash. More preferably, the hydraulic component includes at least 70% hydraulic fly ash. More preferably, the hydraulic component includes at least 75% hydraulic fly ash. More preferably, the hydraulic component includes at least 80% hydraulic fly ash. More preferably, the hydraulic component includes at least 85% hydraulic fly ash. More preferably, the hydraulic component includes at least 90% hydraulic fly ash. More preferably, the hydraulic component includes at least 95% hydraulic fly ash. More preferably, the hydraulic component includes at least 99% hydraulic fly ash. The remainder of the hydraulic component includes any hydraulic materials or mixtures thereof. In another embodiment of this invention, the hydraulic component is essentially all fly ash.

The total composition preferably includes from about 25% to about 92.5% by weight of the hydraulic component. More preferably, the hydraulic component makes up from about 40% to about 92.5% by weight of the composition. More preferably, the hydraulic component makes up from about 50% to about 92.5% by weight of the composition. More preferably, the hydraulic component makes up from about 55% to about 92.5% by weight of the composition. More preferably, the hydraulic component makes up from about 60% to about 92.5% by weight of the composition. More preferably, the hydraulic component makes up from about 65% to about 92.5% by weight of the composition. More preferably, the hydraulic component makes up from about 45% to about 85% by weight of the composition. More preferably, the hydraulic component makes up from about 50% to about 85% by weight of the composition. More preferably, the hydraulic component makes up from about 55% to about 85% by weight of the composition. More preferably, the hydraulic component makes up from about 60% to about 85% by weight of the composition. More preferably, the hydraulic component makes up from about 65% to about 85% by weight of the composition. More preferably, the hydraulic component makes up from about 40% to about 80% by weight of the composition. More preferably, the hydraulic component makes up from about 45% to about 80% by weight of the composition. More preferably, the hydraulic component makes up from about 50% to about 80% by weight of the composition. More preferably, the hydraulic component makes up from about 55% to about 80% by weight of the composition. More preferably, the hydraulic component makes up from about 60% to about 80% by weight of the composition. More preferably, the hydraulic component makes up from about 65% to about 80% by weight of the composition. More preferably, the hydraulic component makes up from about 40% to about 75% by weight of the composition. More preferably, the hydraulic component makes up from about 45% to about 75% by weight of the composition. More preferably, the hydraulic component makes up from about 50% to about 75% by weight of the composition. More preferably, the hydraulic component makes up from about 55% to about 75% by weight of the composition. More preferably, the hydraulic component makes up from about 60% to about 75% by weight of the composition. More preferably, the hydraulic component makes up from about 65% to about 75% by weight of the composition.

The polymer is a water-soluble, film-forming polymer, preferably a latex polymer. The polymer can be used in either liquid form or as a redispersible powder. A particularly preferred latex polymer is a methyl methacrylate copolymer of acrylic acid and butyl acetate (Forton VF 774 Polymer, EPS Inc. Marengo, Ill.).

Although the polymer is added in any useful amount, it is preferably added in amounts of from about 5% to 35% on a dry solids basis. More preferably, the composition includes from about 10% to about 35% polymer. More preferably, the composition includes from about 15% to about 35% polymer. More preferably, the composition includes from about 20% to about 35% polymer. More preferably, the composition includes from about 5% to about 30% polymer. More preferably, the composition includes from about 10% to about 30% polymer. More preferably, the composition includes from about 15% to about 30% polymer. More preferably, the composition includes from about 20% to about 30% polymer. More preferably, the composition includes from about 5% to about 25% polymer. More preferably, the composition includes from about 10% to about 25% polymer. More preferably, the composition includes from about 10% to about 20% polymer. More preferably, the composition includes from about 15% to about 20% polymer. More preferably, the composition includes from about 5% to about 15% polymer. More preferably, the composition includes from about 10% to about 15% polymer.

In order to form two interlocking matrix structures, water must be present to form this composition. The total water in the composition should be considered when adding water to the system. If the latex polymer is supplied in the form of an aqueous suspension, water used to disperse the polymer should be included in the composition water. Any amount of water can be used that produces a flowable mixture. Preferably, about 5 to about 35% water by weight is used in the composition. More preferably, the amount of water ranges from about 10% to about 35% by weight. More preferably, the amount of water ranges from about 15% to about 35% by weight. More preferably, the amount of water ranges from about 20% to about 35% by weight. More preferably, the amount of water ranges from about 25% to about 35% by weight. More preferably, the amount of water ranges from about 30% to about 35% by weight. More preferably, the amount of water ranges from about 15% to about 30% by weight. More preferably, the amount of water ranges from about 10% to about 30% by weight. More preferably, the amount of water ranges from about 20% to about 30% by weight. More preferably, the amount of water ranges from about 25% to about 30% by weight. More preferably, the amount of water ranges from about 15% to about 25% by weight. More preferably, the amount of water ranges from about 10% to about 25% by weight. More preferably, the amount of water ranges from about 20% to about 25% by weight. More preferably, the amount of water ranges from about 15% to about 20% by weight. More preferably, the amount of water ranges from about 10% to about 20% by weight of water per 100 parts of dry hydraulic component.

The addition of water to the hydraulic component initiates hydration reactions. Water of hydration is absorbed from the slurry to form the crystalline matrix of the cementitious material. As the free water decreases, the polymer begins forming a film and hardens. Since both of these processes occur virtually simultaneously, the crystalline matrix of the cementitious material and the polymer film become intimately intertwined in each other, forming strong links between these two substances.

Superplasticizer additives are known to improve the fluidity of a hydraulic slurry. They disperse the molecules in solution so that they move more easily relative to each other, thereby improving the flowability of the entire slurry. Polycarboxylates, sulfonated melamines and sulfonated naphthalenes are known as superplasticizers. Preferred superplasticizers include ADVA Cast by Grace Construction Products, Cambridge, Mass. and Diloflo GW Superplasticizer of Geo Specialty Chemicals, Cedartown, Ga. The addition of these materials allows the user to tailor the fluidity of the slurry to the particular application.

Conventional inorganic fillers and aggregates are also useful to reduce cost and decrease shrinkage cracking. Typical fillers include sand, talc, mica, calcium carbonate, calcined clays, pumice, crushed or expanded perlite, volcanic ash, rice husk ash, diatomaceous earth, slag, metakaolin, and other pozzolanic materials. Amounts of these materials should not exceed the point where properties such as strength are adversely affected. When very thin membranes or underlayments are being prepared, the use of very small fillers, such as sand or microspheres are preferred.

Colorants are optionally added to change the color of the composition or finished articles. Fly ash is typically gray in color, with the Class C fly ash usually lighter than Class F fly ash. Any dyes or pigments that are compatible with the composition may be used. Titanium dioxide is optionally used as a whitener. A preferred colorant is Ajack Black from Solution Dispersions, Cynthiana, Ky.

Set control additives that either accelerate or retard the setting time of the hydraulic component are contemplated for use in these compositions. The exact additives will depend on the hydraulic components being used and the degree to which the set time is being modified.

Reinforcing materials can be used to add strength to the composition. The addition of fibers or meshes optionally help hold the composition together. Steel fibers, plastic fibers, such as polypropylene and polyvinyl alcohols, and fiberglass are recommended, but the scope of reinforcing materials is not limited hereby.

Superplasticizer additives are known to improve the fluidity of a hydraulic slurry. They disperse the molecules in solution so that they move more easily relative to each other, thereby improving the flowability of the entire slurry. Polycarboxylates, sulfonated melamines and sulfonated naphthalenes are known as superplasticizers. Preferred superplasticizers include ADVA Cast by Grace Construction Products, Cambridge, Mass. and Dilflo GW Superplasticizer of Geo Specialty Chemicals, Cedartown, Ga. The addition of these materials allows the user to tailor the fluidity of the slurry to the particular application.

Shrinkage reducing agents help decrease plastic shrinkage cracking as the product dries. These generally function to modify the surface tension so that the slurry flows together as it dries. Glycols are preferred shrinkage reducing agents.

The hydraulic component, polymer, water and any optional components are combined in a mixer and mixed until a homogeneous blend is obtained. Preferably, the mixer is a high shear mixer providing a short residence time. For small batches of product, a typical laboratory blender is a suitable mixing device. For larger commercial operations, the use of commercially available continuous mixers manufactured by the PFT GMBH and Co. KG, based in Iphofen, Germany, are suitable. Continuous mixers have the capability of mixing as well as pumping the slurry in a continuous manner to the point of application. These mixers have a mixing chamber where all solid dry materials are blended together with the liquid additives including water using a cage agitator rotating at a high speed. In the normal mode of operation, the blended cementitious slurry continuously exits the mixing chamber and is pumped forward by a progressive cavity pump (rotor-stator type pump) to the point of application. The preferred PFT mixer models for this invention include PFT Mixing Pump G4, PFT Mixing Pump G5, PFT Monojet 2.13, PFT Mixing Pump T2E, PFT Mixing Pump MS1 and MS2.

Another preferred mixer is a high-shear batch mixer. The batch mixer is preferred in some applications, particularly where the slurry must be fed to more than one area of the manufacturing line. The wet ingredients are changed to the mixer, followed by the dry components. After mixing, the entire batch is dumped into a pot for continuous distribution to the line. If distribution to more than one location is desired, multiple pumps with separate destinations can be used to distribute the slurry from the pot.

After mixing, the flowable slurry exits from the mixer and can be poured into a mold or extruder, onto release paper or onto a base mat for shaping into an appropriate shape. Any method may be used to shape the composition, including molding, extruding, troweling, calendaring, rolling, screeding, or any shaping method suitable for the article being produced.

The composition is also useful as a coating to give favorable properties to one or more sides of an article. A membrane for use as an underlayment for ceramic tile can be prepared preferably by rolling or screeding the slurry onto a base mat or scrim. The finished side of a ceramic tile could be coated to provide a deformable surface. Statuary or architectural moldings could be made of a different core, then coated with sufficient thickness of this composition to allow the piece to be shaped, carved, fit or detailed using common tools.

In the examples that follow, all components are measured by weight unless otherwise stated. The latex polymer used here, Forton VF774, was in a liquid form and included 51% polymer solids and 49% water. In the examples that follow, "water" refers to added water and does not include that in the latex polymer. Of the amounts reported for the polymer, 51% of the amount is in the form of dry solids.

EXAMPLE 1

A slurry was made from the components from Mix 1 of Table 1. No water in addition to that contained in the liquid polymer was added to form the slurry.

TABLE 1

Components of Examples 1-4

| Component | Trade Name | Mix 1 | Mix 2 | Mix 3 |
|---|---|---|---|---|
| Class C Fly Ash | Bayou | 66.8% | 32.2% | 0 |
| Portland cement | | 0 | 32.2% | 62.4% |
| Water | | 0 | 3.53 | 6.54 |
| Acrylic Polymer Latex | Forton VF774 | 32.8% | 31.58% | 30.60% |
| Polycarboxylate Superplasticizer | Adva Cast | 0.3% | 0.3% | 0.3% |
| Colorant | Ajack Black 8044 | 0.13%% | 0.13% | 0.13% |

All of the above components were placed in a high-shear blender and blended for 30 seconds to form a slurry. A panel ¼" (0.6 mm) in thickness and measuring 6"×12" (15 cm×30 cm) was also cast in the laboratory from the slurry. It was dried at room temperature for several hours. As the panel dried, there was no shrinkage cracking of the material. The nature of the composite was similar to that of rubber, only it was harder and more flexible.

The flexibility of the resulting panel is demonstrated in FIG. 1. The panel was flexed along its 12" (30 cm) length until an arch approximately 4" (10 cm) in height was formed. There was no visible cracking as a result of flexing the material. Even after such large deformations, the panel regained its original shape with no signs of damage.

Fatigue of the material was tested by repeated flexing of the cast flat panel into a 4" (10 cm) arch as shown in FIG. 1. After 50 such flexings, there was no sign of cracking or damage. The material has an ultimate tensile strain capacity of >2% and a tensile toughness of 30 inch-pounds per square inch (435 N-m/m$^2$).

Figure 2:
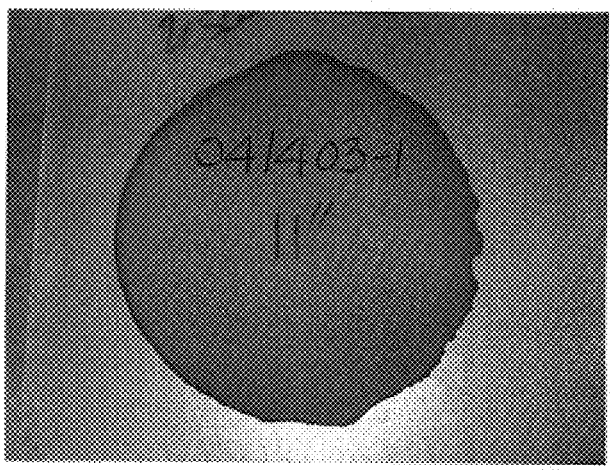
FIG. 2 shows a patty cast from of the composition of Mix 1 of Example 1.

The flow behavior of the slurry was characterized by filling a calibrated brass cylinder 4" (10.2 cm) in height and 2" (5.1 cm) in internal diameter with the slurry. The cylinder was lifted up, allowing the slurry to exit from the bottom of the cylinder and spread. An 11" (28 cm), self-leveled patty formed from the slurry, as shown in FIG. 2.

EXAMPLE 2

Figure 3:
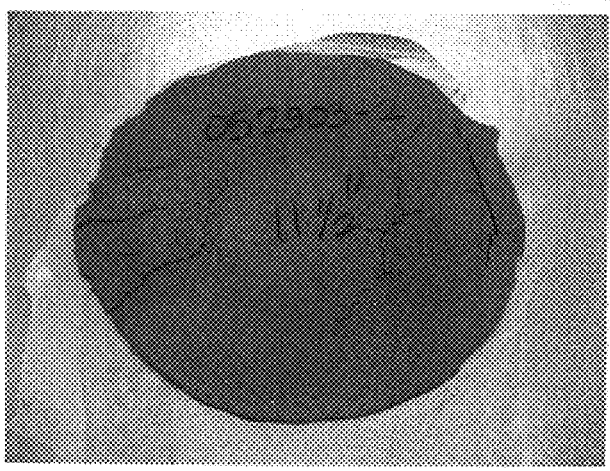
FIG. 3 shows a patty cast from the composition of Mix 3 of Example 1 having no fly ash present.
Figure 4:
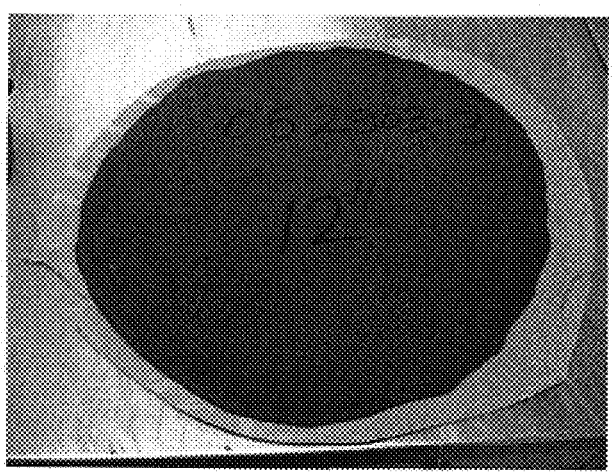
FIG. 4 shows a patty cast from Mix 2 of Example 1 having 50% fly ash.

A slurry from each of Mix 2 and Mix 3 in Table 1 was prepared according to the method of Example 1. Circular patties were cast from each of the slurries as described in Example 1 and allowed to dry. The patty from Mix 2 is shown in FIG. 3, while FIG. 4 shows the patty of Mix 3. Mixes 2 and 3 developed significant shrinkage cracking as the patty dried, most of it within the first two hours after casting. The fly ash composition of Example 1 developed no cracking at all as shown in FIG. 2. This demonstrates the superior shrinkage cracking resistance and dimensional stability of compositions that include more than 50% fly ash.

EXAMPLE 3

Tensile properties of a sample of Mix 1 were tested in a Model 810 close-loop, displacement-controlled testing machine by MTS Systems Corp. of Eden Prairie, Minn. A rectangular specimen was prepared measuring 8" in length, 2" wide and ¼" in thickness. Notches ½" long were cut on both sides of the specimen at mid height. Testing was conducted when the specimen was 28 days of age. Results of the tests are shown in Table II below.

TABLE II

Physical Properties of Mix 1

| Property | Mix 1 | Plain Concrete |
|---|---|---|
| Ultimate Tensile Strain (%) | 2.00 | 0.01 |
| Tensile Toughness$^a$, lb-inch/inch$^2$ | 32.0 | 0.12 |
| (g-cm/cm$^2$) | (5,690) | (21) |
| Tensile Strength, psi | 246 | 290 |
| (kg/cm$^2$) | (17.2) | (20.3) |
| Modulus of Elasticity, psi | 279 | 20000 |
| (kg/cm$^2$) | (19.5) | (1400) |

Results for concrete are those reported in the literature. "Plain concrete" is the set product of Portland cement, sand, aggregate and water. This test shows that the fly ash composition has exceptional ductility and toughness as indicated by the ultimate tensile strain and tensile toughness numbers. Tensile toughness represents energy required to fracture a specimen per unit cross-sectional area. In both of these tests, the fly ash composition of Mix 1 showed tensile strain and tensile toughness about 200 times greater than concrete. Increased elasticity, approaching that of rubber, is measured by the severe decrease in the modulus of elasticity over concrete.

EXAMPLE 4

The use of other pozzolanic materials was tested by replacing a portion of the fly ash with other pozzolans. Three compositions were made using silica fume, as shown in Table III below.

TABLE III

Components of Example 4

| Ingredient | Mix 4 | Mix 5 | Mix 6 |
|---|---|---|---|
| Class C Fly Ash (Bayshore, MI) | 58.06 | 59.37 | 62.91 |
| Silica Fume | 6.45 | 3.13 | 3.31 |
| Water | 3.21 | 6.86 | 0.65 |
| Acrylic Polymer Latex (Forton VF77) Polymer solids content - 51% and Water content - 49% | 31.63 | 30.64 | 32.47 |
| Polycarboxylate superplasticizer (Adva Cast) | 0.65 | 0.00 | 0.66 |
| Colorant (Ajack Black AJ 61) | 0.00 | 0.00 | 0.00 |

The mixes in Table III above were mixed and subjected to the patty test described in Example 1. In Mix 4, 10% of the fly ash was replaced with silica fume. Mixes 5 and 6 replaced only 5% of the fly ash with silica fume. A superplasticizer was added to Mixes 4 and 6, but not to Mix 5.

Figure 5:
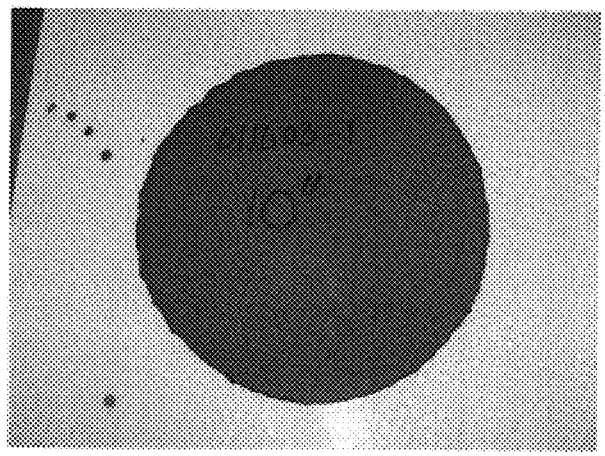
FIG. 5 shows a patty cast from the composition of Mix 4 of Example 4.
Figure 6:
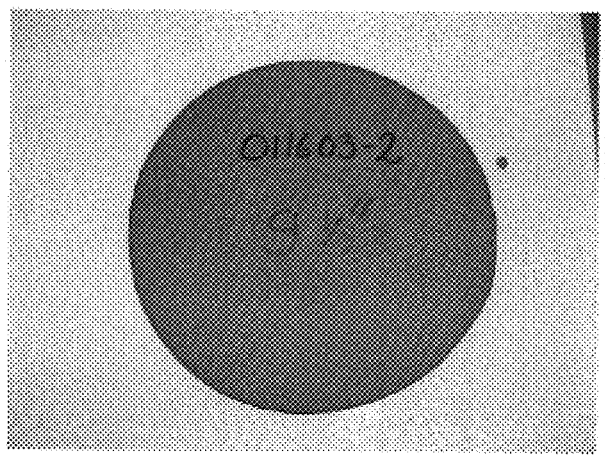
FIG. 6 shows a patty cast from the composition of Mix 5 of Example 4.
Figure 7:
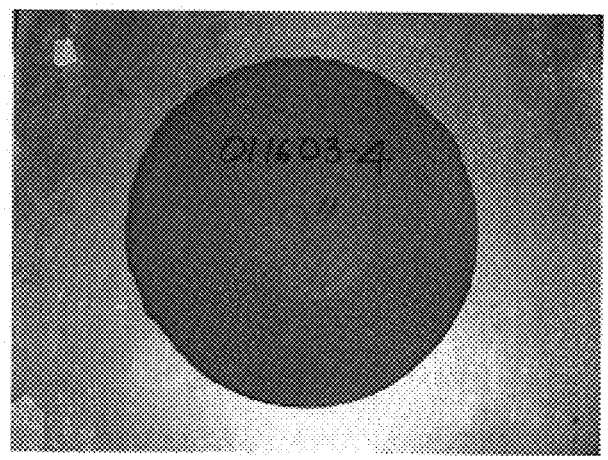
FIG. 7 shows a patty cast from the composition of Mix 6 of Example 4.

Patties cast using Mix 4, Mix 5 and Mix 6 are shown in FIGS. 5, 6 and 7, respectively. All patties were self-leveling and produced no stress cracks.

While particular embodiments of the present fly ash composition and method for making it has been shown and described, it will be appreciated by those skilled in the art that changes and modifications may be made thereto without departing from the invention in its broader aspects and as set forth in the following claims.

What is claimed is:

1. A composition for the manufacture of articles comprising:
    a hydraulic component comprising at least 55% Class C fly ash;
    about 10% to about 25% of a water-soluble, film-forming polymer on a dry, weight basis; and
    water.

2. The composition of claim 1 wherein said hydraulic component consists essentially of fly ash.

3. The composition of claim 1 wherein the composition comprises at least 25% of said hydraulic component by weight.

4. The composition of claim 3 wherein the composition comprises at least 40% of said hydraulic component by weight.

5. The composition of claim 1 wherein said polymer comprises at least 5% by weight of the composition.

6. The composition of claim 1 wherein said composition further comprises one or more of the group consisting of dispersants, surfactants, water reducing agents, set accelerators, set retarders, foaming agents, defoamers, colorants, shrinkage reducing agents, reinforcing fibers and fillers.

7. The composition of claim 6 wherein said fillers comprise inorganic minerals, lightweight fillers, organic fillers and aggregates.

8. A composition for the manufacture of articles comprising:
    a hydraulic component comprising at least 55% Class C fly ash;
    a water-soluble, film-forming polymer; and
    water in an amount of less than about 15% by weight.

9. The composition of claim 1 wherein said water is present in amounts of less than 10% by weight.

* * * * *

UNITED STATES PATENT AND TRADEMARK OFFICE
CERTIFICATE OF CORRECTION

PATENT NO. : 7,347,895 B2  Page 1 of 1
APPLICATION NO. : 11/224403
DATED : March 25, 2008
INVENTOR(S) : Ashish Dubey It is certified that error appears in the above-identified patent and that said Letters Patent is hereby corrected as shown below:

Column 5, lines 49-59, please delete "Superplasticizer additives are known to improve the fluidity of a hydraulic slurry. They disperse the molecules in solution so that they move more easily relative to each other, thereby improving the flowability of the entire slurry. Polycarboxylates, sulfonated melamines and sulfonated naphthalenes are known as superplasticizers. Preferred superplasticizers include ADVA Cast by Grace Construction Products, Cambridge, MA and Diloflo GW Superplasticizer of Geo Specialty Chemicals, Cedartown, GA. The addition of these materials allows the user to tailor the fluidity of the slurry to the particular application."

Column 5, line 49, please insert the following paragraph: --Any well-known additives for cements or polymer cements can be useful in any of the embodiments of the instant composition to modify it for a specific purpose or application. Fillers are added for a variety of reasons. The composition or finished product can be made even more lightweight if lightweight fillers, such as expanded perlite, other expanded materials or either glass, ceramic or plastic microspheres, are added. Microspheres reduce the weight of the overall product by encapsulating gaseous materials into tiny bubbles that are incorporated into the composition thereby reducing its density. Foaming agents used in conventional amounts are also useful for reducing the product density.--

Column 6, line 28, change "Dilflo" to --Diloflo--.

Signed and Sealed this

Twenty-second Day of July, 2008

JON W. DUDAS
*Director of the United States Patent and Trademark Office*